April 14, 1953  R. F. SHEA  2,635,032
RECORDING SYSTEM
Filed Jan. 6, 1950
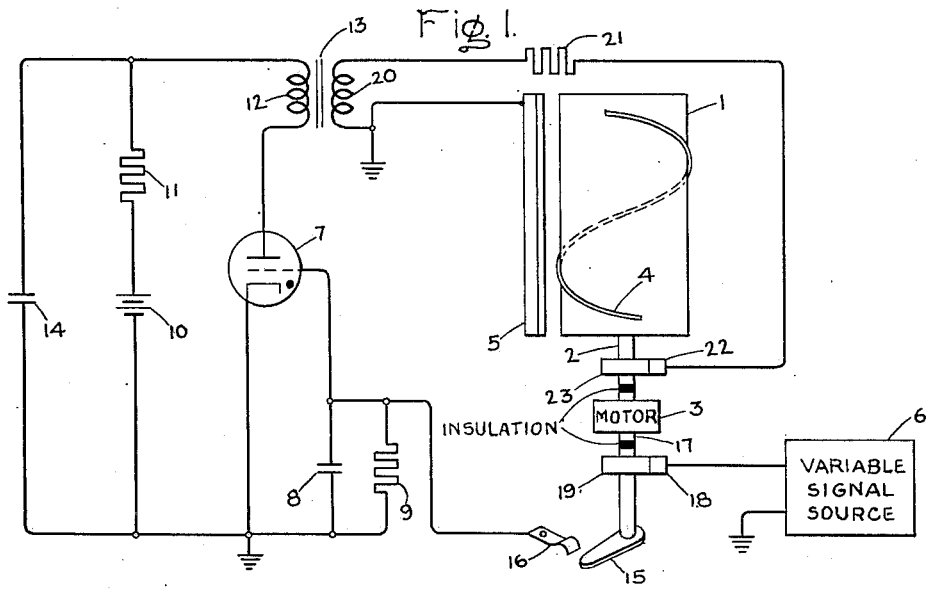
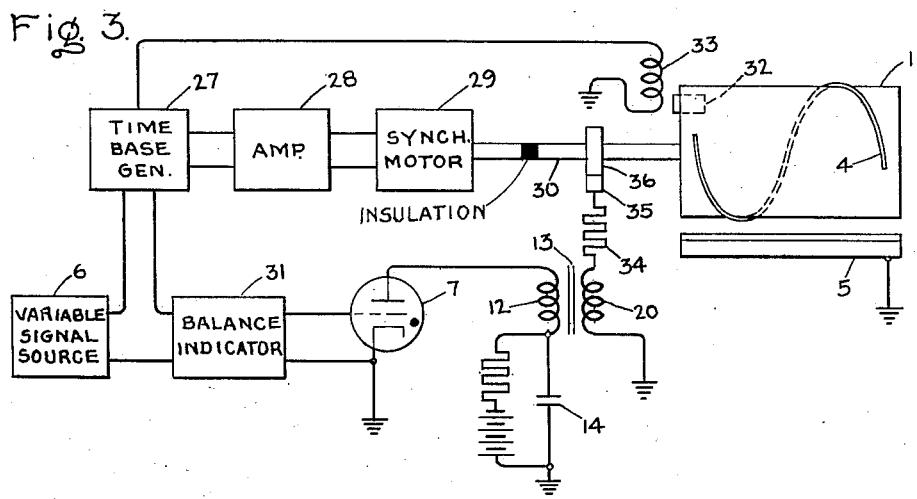
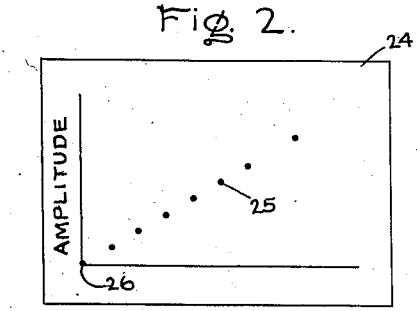
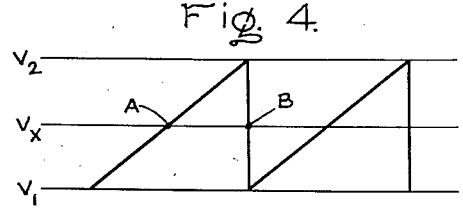
Inventor:
Richard F. Shea,
by Merton D. Moore
His Attorney.

Patented Apr. 14, 1953

2,635,032

UNITED STATES PATENT OFFICE 2,635,032

RECORDING SYSTEM

Richard F. Shea, Syracuse, N. Y., assignor to General Electric Company, a corporation of New York Application January 6, 1950, Serial No. 137,238

8 Claims. (Cl. 346—33)

The present invention relates to a recording system and particularly to an arrangement for recording the characteristics of electrical signals.

Oftentimes when information is presented in the form of variable electrical signals, the need arises for obtaining a rapid, time indexed, permanent record of the variable information. Previous systems employed to achieve these features have been found to be undesirably complex and oftentimes unsatisfactory for rugged operating conditions. Furthermore, where the information is usually available in the form of amplitude, angle, pulse, etc. modulation of electrical energy, as for example for telemetering purposes, like radiosonde, a system adaptable to process any of these various forms of information is desirable.

An object of my invention is to provide an improved electrical signal recording system.

A further object of my invention is to provide an arrangement for measuring the characteristics of electrical signals by means of a novel comparison system.

A further object of my invention is to provide an improved electrical wave recording system employing coincidence circuits for obtaining a record on electrically sensitive paper.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing wherein Fig. 1 illustrates schematically an embodiment of my invention employing time constant circuits. Fig. 2 illustrates a record produced by the arrangement of Fig. 1. Fig. 3 illustrates schematically an embodiment of my invention employing coincidence circuits, and Fig. 4 shows the wave forms encountered in the electrical circuit arrangement of Fig. 3.

Briefly, an embodiment of my invention comprises a recording arrangement including a movable member whose instantaneous position in time with respect to a reference time is known, an arrangement for converting a signal having a characteristic variable with time into a signal having a time displacement with respect to said reference time corresponding to the value of said characteristic, and an arrangement for causing said recording arrangement to record the value of said characteristic in response to time coincidence of a known position of said member and a time displacement signal.

Referring to Fig. 1, a moving recording medium comprising an electrical recording drum 1 is arranged for rotational movement about axis 2 under the control of motor 3. Drum 1 has an upraised knife edge or moving electrode 4 spirally contained along its surface. Associated with drum 1 is fixed electrode 5, in the form of a plate, arranged in close proximity to the surface of drum 1 such that upon relative movement of drum 1 and plate 5 successive portions of the moving electrode are brought in close proximity to the fixed electrode 5. Thus it is seen for each rotation of drum 1 about axis 2, an effective scanning of the length of the fixed electrode 5 is achieved by moving electrode 4. If the angular position of drum 1 from a fixed reference position is calibrated in time, and an electrical signal, having a variable time displacement with respect to a reference time associated with said reference position, is electrically coupled between fixed electrode 5 and electrode 4, an electric spark may be caused to jump between the electrodes 4 and 5. The point of sparking along electrode 5 may be interpreted to indicate a measurement of the time displacement of said signal.

The arrangement of Fig. 1 lends itself readily to identification of any of the various previously mentioned forms of information capable of being reduced to a variable amplitude direct current representative of the information and available from source 6. Thyratron 7 is associated with an input timing circuit in the form of condenser 8 and resistor 9 connected between its cathode and grid electrodes and a plate voltage source comprising battery 10 coupled by resistor 11 and the primary winding 12 of transformer 13 to the plate electrode of thyratron 7. Condenser 14 coupled across resistor 11 and battery 10 charges up to the full value of the battery under normal conditions and under appropriate conditions may be discharged through thyratron 7. Motor 3 causes momentary engagement of rotating switch blade 15 and fixed contact 16 by means of shaft 17 at the beginning of a cycle of revolution of drum 1, thereby applying the negative going output signals from source 6 to the condenser 8 over brush 18 and revolving contact 19 mounted on shaft 17. The charging circuit of condenser 8 is arranged to quickly charge condenser 8 to the peak value of the negative signal from source 6. As soon as blade 15 is disengaged from contact 16, the negative voltage across condenser 8 begins to discharge through resistor 9 in the normal sawtooth fashion. Thyratron 7 is arranged to be non-conductive with the negative voltage across condenser 8 coupled to its grid and hence no current flows through winding 12. However, after a sufficient time interval subsequent to charging of condenser 8, the negative voltage at the grid of thyratron 7 will have been reduced, due to discharge of condenser 8 by resistor 9, such that thyratron 7 fires, discharging the energy stored in condenser 14. The discharge of condenser 14 through the primary winding 12 induces a voltage impulse in the secondary winding 20 of transformer 13. This voltage impulse is coupled between fixed electrode 5 and through current limiting resistor 21, brush 22 and revolving contact 23 driven by shaft 2 to metallic drum 1 resulting in a spark discharge between electrode 5 and the movable electrode 4. By inserting a sheet of electrically sensitive paper 24 (Fig. 2) between plate electrode 5 and knife edge electrode 4, a mark is obtained on the paper having a position displacement representative of the peak value of the signal from source 6. Electrically sensitive papers for the purpose indicated are commercially available having a current or voltage dependence for marking purposes. Thus it is seen that depending upon the amplitude of the negative voltage delivered to condenser 8, a corresponding time displacement signal is obtained to produce a mark along paper 24, whose displacement from a fixed reference point is indicative of the amplitude of the negative signal.

In the event a single spark is produced for one revolution of the drum 1, the position of the spark 25 with respect to a reference point 26 on paper 24 would be indicative of the amplitude of the signal producing the spark as shown in Fig. 2. Should the voltage from source 6 be a unidirectional signal varying only in one direction with time, a series of sparks would be produced tracing out the amplitude variation curve of the output of source 6 as shown by the remaining dots.

Fig. 3 illustrates another embodiment of applicant's invention wherein a sawtooth wave is employed to measure the unknown signal from the source 6 and at the same time controls the rotation of drum 1. The time base generator 27 provides a linearly varying voltage at a periodic rate as shown in Fig. 4 operating between the limits V1 and V2. The output of the sawtooth generator is amplified in amplifier 28 and employed to drive synchronous motor 29 at the repetition rate of the sawtooth waves. Motor 29 in turn is coupled by means of shaft 30 to the drum 1 whereby relative movement is provided between electrodes 4 and 5 as previously described.

While the sawtooth generator is shown to be the primary control of the operation of motor 29 and drum 1, a magnet 32 imbedded at one end of drum 1 may be provided to induce a synchronizing signal in winding 33 at the commencement of each cycle of rotation of the drum 1 under the control of the driving action of motor 29. This synchronizing signal is then employed to initiate a sawtooth voltage by generator 27. Any of the many well-known types of triggered sawtooth generators may be employed, as for example that shown on page 262 of Radar Electronic Fundamentals, War Department, June 1944. Other control actions will lend themselves readily to providing synchronism between drum rotation and amplitude of the sawtooth waves.

The balance indicator 31 comprises a null type indicator responsive only to the value of the net signal across its input terminals and not to the polarity thereof for actuating the firing of thyratron 7. Thus the variable signal voltage from source 6 shown as $V_x$ in Fig. 4 is coupled to the indicator 31 together with the sawtooth voltage from source 27. Indicator 31 is arranged to produce a triggering signal in response to coincidence of the sawtooth wave amplitude and the amplitude of the signal from source 6. Many such circuits commonly referred to in the art as coincidence circuits are available to produce this result, as for example that shown in Patent 2,414,477 to L. A. Meacham, dated January 21, 1947. A similar action may also be achieved by a simple relay arrangement embodying balanced windings such that a triggering action is achieved only upon coincidence of the applied signals. Thus, when coincidence of the amplitudes of the sawtooth wave and $V_x$ occurs, as at A of Fig. 4, thyratron 7 which has been normally non-conductive is triggered to substantially instantaneously discharge condenser 14 through winding 12 thereby impressing a voltage impulse in the secondary winding 20 as previously described. The voltage developed across winding 20 is coupled by resistor 34, brush 35 and contact 36 between electrodes 4 and 5 such that a discharge occurs causing a mark or perforation of paper 24. Since the helical electrode 4 rotates in synchronism with the sawtooth voltage sweep which is linear, each position of the fixed electrode 5 and helical electrode 4 intersection is represented by a particular voltage on the sawtooth voltage curve shown in Fig. 4. Thus the direct voltage from source 6 is compared as to amplitude with the linear sawtooth voltage from source 27 resulting in the marking of paper 24 during coincidence of the two voltages.

It will be noted that the sawtooth voltage equals the voltage $V_x$ at two points A and B in Fig. 4. Point A will produce a spark at the proper position on the paper. Point B may be prevented from making another spark by the choice of time constant of the indicator 31, as the rate of fall of voltage as it passes through B is very rapid. If, on the other hand, a spark is made, it will occur at one end of the paper and may be employed to check the limits of travel.

While I have disclosed in the drawings a particular design of the electrodes 4 and 5 and particular relative motion therebetween, other forms and other motions may be resorted to in order to produce a desired shaped record scan. The use of a helical spiral and a fixed electrode provides a linear trace in the particular arrangement disclosed. Furthermore, the time base generator 27 may be employed to produce any desirable time base wave configuration provided a known relationship exists between instantaneous time base wave signal amplitude and relative position of electrodes 4 and 5.

While I have shown only certain preferred embodiments of my invention by way of illustration, many modifications will occur to those skilled in the art and I, therefore, wish to have it understood that I intend, in the appended claims, to cover all such modifications as fall within the true spirit and scope of my invention.

What I claim as new and desired to secure by Letters Patent of the United States is:

1. A recording apparatus for direct voltage having a variable amplitude, comprising a fixed planar electrode, a movable substantially linear electrode spaced from said fixed electrode, means for scanning said movable electrode over said fixed electrode to trace out a given path, means synchronized with said scanning to produce a sawtooth voltage having an amplitude linearly related to the displacement of said scan with respect to a reference position, circuit means responsive to coincidence of the amplitudes of said direct voltage and said sawtooth voltage for producing a trigger impulse, means for applying said trigger impulse between said electrodes to produce an electrical discharge, electrically sensitive material mounted between said electrodes whereby a mark is produced on said material having a displacement with respect to said reference position indicative of the amplitude of said direct voltage.

2. An arrangement for identifying a voltage having an amplitude variable with time, comprising a movable element having a variable position with respect to a reference time, a source of second voltage synchronized with said movable element, a voltage coincidence indicator having two input circuits, one of said input circuits being connected to receive said first voltage and the other input circuit being connected to receive said second voltage, said coincidence indicator including means for producing a voltage pulse whenever the instantaneous value of said second voltage has a predetermined amplitude relation to said first voltage, and means responsive to said pulse for identifying the amplitude of said first voltage during the time of coincidence of said pulse and a predetermined position of said movable element.

3. An arrangement for measuring a voltage signal having an amplitude variable with time, comprising a source of a second voltage signal having an amplitude variable with time, the frequency of said second signal being substantially higher than said first signal, a voltage coincidence indicator having two input circuits, one of said input circuits being connected to receive said first signal and the other input circuit being connected to receive said second signal, said coincidence indicator including means for producing a voltage pulse whenever the instantaneous value of said second signal is substantially equal to that of said first signal, a device including a pair of electrodes, means providing relative movement between said electrodes whereby a dimension of one of said electrodes is scanned by the other electrode, said scanning being synchronized with said second signal, and means responsive to said pulse for initiating a discharge between said electrodes.

4. Apparatus for recording a signal having amplitude variable with time, comprising a fixed planar electrode, a movable electrode spaced from said fixed electrode, means for scanning said movable electrode over said fixed electrode, means synchronized with said scanning to produce a calibrating signal having an amplitude variable in accordance with the position of said scan with respect to a reference position of said scan, means responsive to a condition of equality of the amplitudes of said calibrating signal and said first signal to produce a trigger signal, and means for applying said trigger signal between said electrodes to produce an electrical discharge therebetween.

5. Apparatus for recording a signal having amplitude variable with time, comprising a fixed planar electrode, a movable electrode spaced from said fixed electrode, means for scanning said movable electrode over said fixed electrode, means synchronized with said scanning to produce a calibrating signal having an amplitude variable in accordance with the position of said scan with respect to a reference position of said scan, means responsive to a condition of equality of the amplitudes of said calibrating signal and said first signal to produce a trigger signal, electrically sensitive material mounted between said electrodes, and means for applying said trigger signal between said electrodes to develop an electrical discharge therebetween thereby causing a mark to be produced on said material indicative of the amplitude of said first signal.

6. Apparatus for recording a signal having amplitude variable with time comprising a fixed planar electrode, a movable electrode spaced from said fixed electrode, means for scanning said movable electrode over said fixed electrode, means synchronized with said scanning to produce a calibrating signal having an amplitude directly proportional to the position of said scan with respect to a reference position of said scan, means responsive to a condition of equality of the amplitudes of said calibrating signal and said first signal to produce a trigger signal, electrically sensitive material mounted between said electrodes, normally inoperative discharge means in series with a direct voltage storage circuit, said last-named means operative in response to said trigger signal to discharge said storage circuit, and means responsive to the discharge of said storage circuit for developing an electrical discharge between said electrodes thereby producing a mark on said material indicative of the amplitude of said first signal.

7. Apparatus for recording a signal having amplitude variable with time comprising a rotating drum, said drum comprising a knife edge electrode helically contained on the surface thereof, a fixed planar electrode having its plane parallel to the axis of rotation of said drum and spaced from said knife edge electrode, means for rotating said drum, means synchronized with said rotation to produce a calibrating signal having an amplitude directly proportional to the position of said knife edge with respect to said planar electrode, balance indicator means responsive to a condition of equality of the values of said calibrating signal and said first signal for producing a trigger signal, electrically sensitive paper mounted between said electrodes, means responsive to said triggering signal and connected between said drum and said planar electrode for producing a mark on said material indicative of the amplitude of said first signal.

8. In a recorder the combination comprising a rotatable helical conductor, means energized by the rotation of said helical conductor for producing a voltage impulse at the beginning of each revolution thereof, a saw-tooth voltage generator connected to receive said voltage impulse and producing substantially rectilinear waves of saw-tooth voltage initiated in response thereto, a voltage coincidence indicator having two input circuits, one of said input circuits being connected to receive said saw-tooth voltage waves and the other of said input circuits being connected to receive a signal voltage to be recorded, said coincidence indicator including means for producing a voltage pulse whenever the instantaneous value of said saw-tooth voltage is substantially equal to said signal voltage, and means for amplifying and delivering said last mentioned voltage pulse to said helical conductor.

RICHARD F. SHEA.

References Cited in the file of this patent

UNITED STATES PATENTS

| Number | Name | Date |
|---|---|---|
| 2,228,883 | Morgan | Jan. 14, 1941 |
| 2,340,880 | Keinath | Feb. 8, 1944 |
| 2,380,482 | Tribble | July 31, 1945 |
| 2,412,310 | Young | Dec. 10, 1946 |
| 2,477,062 | Jacobi | July 26, 1949 |
| 2,516,389 | Hurvitz | July 25, 1950 |
| 2,521,881 | Suomi | Sept. 12, 1950 |
| 2,566,420 | Keinath et al. | Sept. 4, 1951 |